United States Patent [19]

Takei

[11] Patent Number: 4,738,327
[45] Date of Patent: Apr. 19, 1988

[54] RIDING TYPE MOWER

[75] Inventor: Terutaka Takei, Osaka, Japan

[73] Assignee: Kubota, Ltd., Osaka, Japan

[21] Appl. No.: 903,146

[22] Filed: Sep. 3, 1986

[30] Foreign Application Priority Data

Sep. 20, 1985 [JP] Japan ............................ 60-144332[U]
Sep. 20, 1985 [JP] Japan ............................ 60-144334[U]

[51] Int. Cl.$^4$ ............................................ B60K 11/04
[52] U.S. Cl. .................................. 180/68.1; 180/53.7;
    180/68.4; 180/69.21; 180/69.24; 280/5 A; 56/6
[58] Field of Search ............... 180/53.4, 53.7, 53.1,
    180/68.1, 68.2, 68.4, 69.21, 69.24, 69.4;
    280/5 A; 123/196 R, 196 AB; 56/6, 7, 12.8, DIG 12

[56] References Cited

U.S. PATENT DOCUMENTS

| | | | |
|---|---|---|---|
| 3,064,748 | 3/1961 | Hill | 180/69.21 |
| 3,847,241 | 11/1974 | Cameron et al. | 280/5 A |
| 4,086,976 | 5/1978 | Holm et al. | 180/68.4 |
| 4,304,314 | 12/1981 | Sakaguchi et al. | 180/68.4 |
| 4,640,378 | 2/1987 | Dobberpuhl et al. | 180/53.7 |

FOREIGN PATENT DOCUMENTS

| | | | |
|---|---|---|---|
| 2123358 | 11/1971 | Fed. Rep. of Germany | 123/196 AB |
| 1336852 | 7/1963 | France | 180/53.7 |
| 56-11177 | 1/1981 | Japan . | |
| 60-77327 | 5/1985 | Japan . | |

Primary Examiner—David M. Mitchell
Assistant Examiner—Brian L. Johnson
Attorney, Agent, or Firm—Birch, Stewart, Kolasch & Birch

[57] ABSTRACT

A riding type mower, having a vehicle body with a front and a rear end, includes a bonnet disposed rearwardly of an operator's seat and having top and bottom sides, opposite lateral sides and a rear side. The bonnet houses a fuel tank, an engine, an oil cooler, a cooling fan and a radiator, positioned on the vehicle body in that order rearwardly of the operator's seat. The cooling fan forces cooling air from the front rearward. The bonnet is formed with a cooling air discharge opening in its rear side and a cooling air intake opening in its bottom side and lateral sides.

4 Claims, 8 Drawing Sheets

RIDING TYPE MOWER

FIELD OF THE INVENTION AND RELATED ART STATEMENT

The present invention relates to a riding type mower.

Known cooling devices for working vehicles such as tractors include, for example, the one disclosed in Unexamined Japanese Utility Model Publication SHO No. 56-11177. The disclosed arrangement includes an engine at the front toward the direction of advance, an operator's seat at the rear thereof, and a radiator and a fan both arranged in front of the engine. The fan forces air from the front rearward.

On the other hand, riding type mowers are known which include, for example, the one disclosed in Unexamined Japanese Utility Model Publication SHO No. 60-77327. The disclosed mower has an operator's seat in the front portion of the mower with respect to the direction of advance of the mower, an engine at the rear of the seat, and a mower assembly attached to the front portion.

The above-mentioned cooling device is used as the cooling means for such riding type mowers.

Stated more specifically, the riding type mower has at its rear portion a bonnet housing the engine, a radiator and a fan therein. By the fan, cooling air is drawn into the bonnet from the rear side thereof, passed through the radiator and discharged toward the engine in front of the radiator. Thus, the conventional cooling device for the riding mower is adapted to discharge hot air toward the operator's seat.

The operator's seat thus exposed to hot air is therefore in a bad environment. Further with the conventional riding type mower, cooling air is drawn into the bonnet through the rear side thereof which is limited in the area of air passing apertures. Consequently, cooling air passes through the rear side at an increased velocity, producing dust or like deposit on the rear side portion to result in an impaired dustproof efficiency.

OBJECTS AND SUMMARY OF THE INVENTION

An object of the present invention is to provide a riding type mower which can be operated in a good environment without the likelihood that the operator will be exposed to hot cooling air passing through the radiator.

Another object of the present invention is to provide a riding type mower which is improved in dustproof efficiency by allowing cooling air to flow into the bonnet at a reduced velocity and thereby preventing adhesion of dirt or dust to a dustproof netting or the like.

Another object of the present invention is to provide a riding type mower wherein an oil cooler is disposed at an optimum position within the bonnet so that the working oil to be supplied to hydraulic means can be cooled effectively.

These objects can be fulfilled by the following means of the present invention.

According to the present invention a bonnet having top and bottom sides, opposite lateral sides and a rear side is provided in the rear of an operator's seat. The bonnet houses an engine, a cooling fan and a radiator therein, the cooling fan being operable to force cooling air from the front rearward. The bonnet is formed with a cooling air discharge opening in its rear side and a cooling air intake opening in its bottom side.

Within the bonnet, the engine, the cooling fan and the radiator are arranged in this order from the front rearward, and an oil cooler is interposed between the engine and the cooling fan.

The cooling fan is fixed to a drive shaft rotatably supported by the rear side of the engine, and the drive shaft is operatively connected to the crankshaft of the engine by transmission means.

The oil cooler is disposed at one side of the drive shaft.

A cooling air intake opening is formed also in the lateral side of the bonnet.

A mower assembly is positioned in front of and below the operator's seat.

The front side of the bonnet is formed with an opening closed with a fuel tank.

According to the present invention, the current of air produced by the fan flows from the front rearward. The air, after being heated by the heat exchange taking place at the radiator, is therefore discharged rearward from the rear side (end) of the bonnet without striking the operator at the front.

The cooling air comes into contact with the oil cooler disposed between the engine and the fan to cool the oil cooler. Since the cooling air flows from the front rearward, cooling air intake openings can be formed in the lateral sides and bottom of the bonnet. Accordingly, a larger air intake opening area is available than when the air intake opening is formed in the rear side as conventionally practiced. This reduces the velocity of flow of cooling air through the intake opening.

Stated more specifically, the cooling fan draws air into the bonnet from outside through the lateral sides of the bonnet and also through the bottom side thereof at the same time for cooling the radiator and oil cooler. Thus, a sufficient air intake area is available. Although straw, grass clippings, etc. will adhere to the bottom of the bonnet when the outside air is drawn in, such clippings spontaneously fall owing to the vibration of the vehicle during running, so that the outside air can be drawn in smoothly at all times.

DESCRIPTION OF THE PREFERRED EMBODIMENTS

Embodiments of the present invention will be described below with reference to the drawings.

Figure 1:
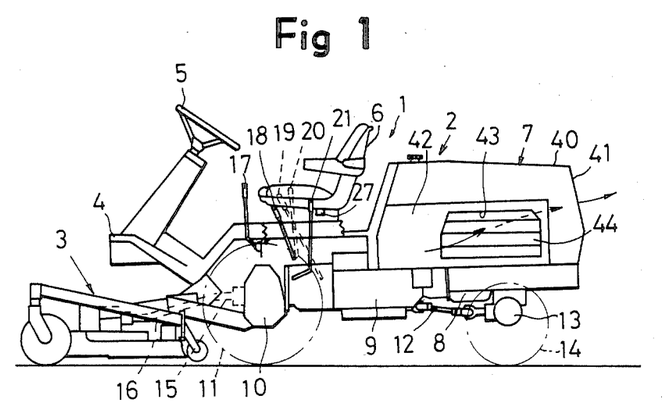
FIG. 1 is an overall side elevation showing a riding type mower embodying the present invention.

FIG. 1 shows a riding type mower 1 embodying the present invention and primarily comprising a self-propelled vehicle 2, and a mower assembly 3 attached to the front portion of the vehicle 2.

The vehicle 2 has a deck 4, a steering wheel 5 and an operator's seat at its front portion, and an engine 8 covered with a bonnet 7 at its rear portion. A transmission case 9 is attached to the front portion of the engine 8 to provide the body of the vehicle 2. Hydraulic stepless speed change means is housed in the case 9.

The power of the engine 8 is transmitted from the transmission case 9 to front wheels 11 through a front wheel differential gear 10 and is also transmitted from an intermediate portion of the case 9 to a rear wheel differential gear 13 through a coupling shaft 12 and further to rear wheels 14. The power of the engine 8 is further transmitted from a PTO shaft 15 projecting from the front end of the vehicle body to the mower assembly 3 via a transmission shaft 16. The rear wheels 14 are operatively connected to the steering wheel 5 for steering the vehicle.

Arranged at the opposite sides of the operator's seat 6 are a speed setting lever 17 for the hydraulic stepless speed change means, a speed change lever 18 for a mechanical speed change gear, a PTO shaft speed change lever 19, an accelerator lever 20 and a lever 21 for changing two-wheel drive to four-wheel drive and vice versa.

Figure 2:
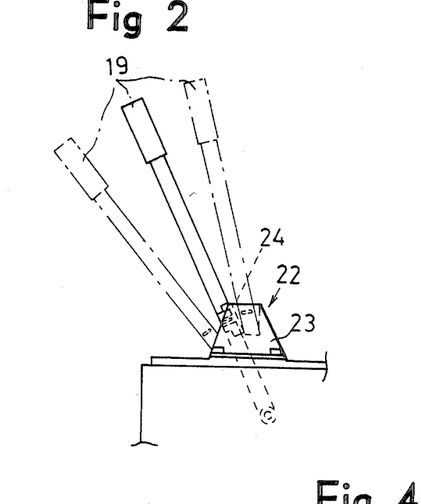
FIG. 2 is a side elevation showing a PTO shaft speed change lever.
Figure 3:
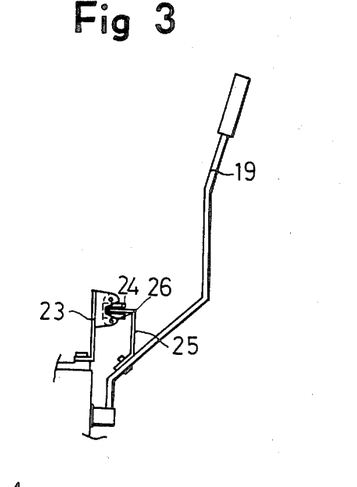
FIG. 3 is a front view showing the speed change lever.
Figure 4:
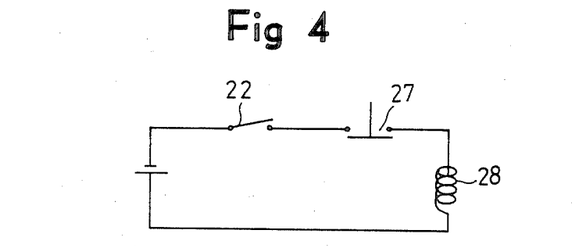
FIG. 4 is a diagram showing an operator's seat switch circuit.

With reference to FIGS. 2 to 4, the PTO shaft speed change lever 19 is provided with a position sensor switch 22. The switch 22 comprises a magnet switch member 24 fixed to a bracket 23 attached to the vehicle body, and an actuator 25 fixed to the speed change lever 19. The lever 19 is selectively shiftable to one of the three positions of high speed H, neutral N and low speed L. The magnet switch member 24 is provided at the neutral position N. When the speed change lever 19 is shifted to the neutral position N, inserting the actuator 25 into a recess 26 of the switch member 24, the switch 22 is electrically turned off. The switch 22 is on when the lever 19 is in the high speed position H or low speed position L.

The position sensor switch 22 is connected in series with an operator's seat switch 27. FIG. 4 shows a circuit including these two switches and an engine stopping solenoid 28 connected thereto. The seat switch 27, which is adapted for detecting whether the operator is in the seat 6, is off when the operator is in the seat, or is on when the operator is absent.

Only when the PTO shaft 15 is in rotation with the operator absent from the seat 6, is the engine stopping solenoid 28 energized to automatically stop the engine 8 to preclude any possible accident.

Figure 5:
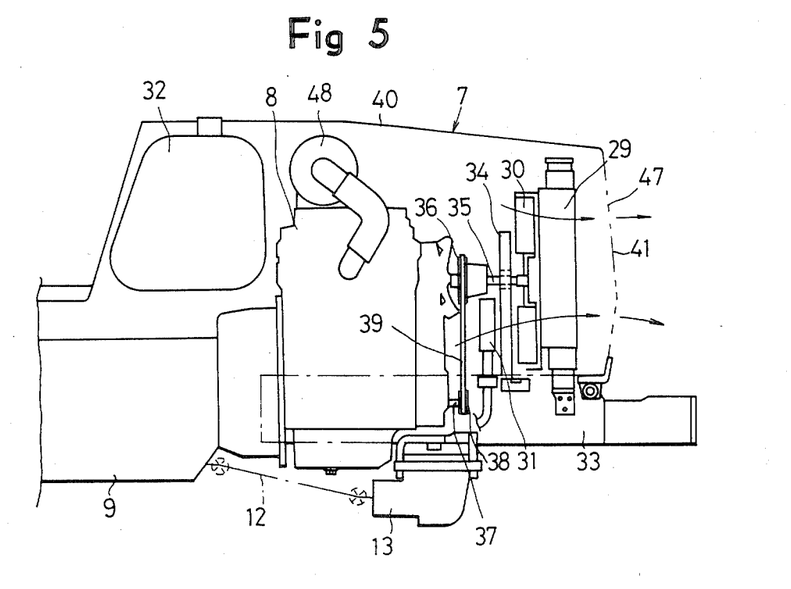
FIG. 5 is a side elevation showing the interior of a bonnet.
Figure 6:
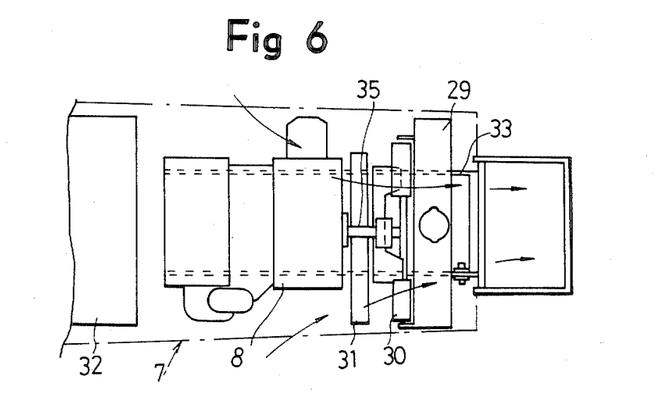
FIG. 6 is a plan view showing the same.

With reference to FIGS. 5 and 6, the bonnet 7 of the riding type mower 1 houses therein a radiator 29 at its rear portion, a cooling fan 30 in front of the radiator 29, an oil cooler 31 in front of the fan 30, and the engine 8 in front of the oil cooler 31. A fuel tank 32 is disposed in front of the engine 8. The fuel tank 32 closes an opening in the front side of the bonnet 7.

The cooling fan 30 is fixed to the rear end of a drive shaft 35 rotatably supported by a fan support frame 34 which is provided between a pair of opposed rear axle frames 33. A pulley 36 is fixed to the front end of the drive shaft 35. Another pulley 38 is fixed to a crankshaft 37 extending from the rear end of the engine 8. A fan drive V-belt 39 is reeved around the pulleys 36 and 38. The oil cooler 31 is disposed below the drive shaft 35 for cooling the working oil for the hydraulic stepless speed change means, etc.

Figure 7:
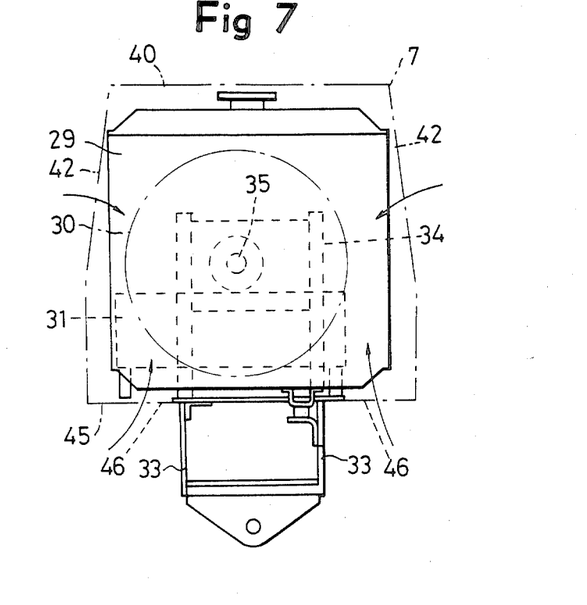
FIG. 7 is a rear view of the same.

The bonnet 7 covering the engine 8, the radiator 29, etc. is pivoted at the lower portion of its rear end to the rear axle frames 33 and includes a top side 40 and a rear side (end) 41 which are therefore pivotally movable together. The bonnet 7 has opposite lateral side portions 42 which are removable. A cooling air intake opening 43 is formed in each lateral side 42. The intake opening 43 is provided with a dustproof netting 44 or the like. The bonnet 7 has a closed bottom side 45 which is also formed with cooling air intake openings 46 having a dustproof netting. The rear side 41 of the bonnet 7 provides a cooling air discharge opening 47.

The current of air produced by the fan 30 flows in the directions of arrows shown in FIGS. 5 to 7 to cool the oil cooler 31 and the radiator 29. Indicated at 48 is an air cleaner.

Figure 8:
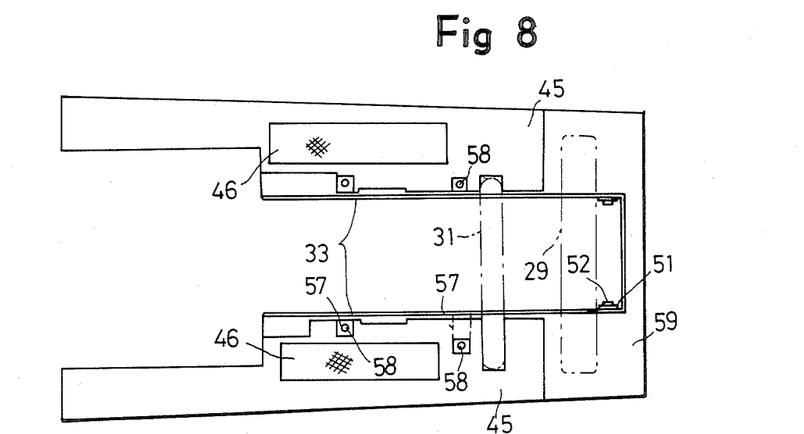
FIG. 8 is a plan view showing the bottom side of another bonnet.
Figure 9:
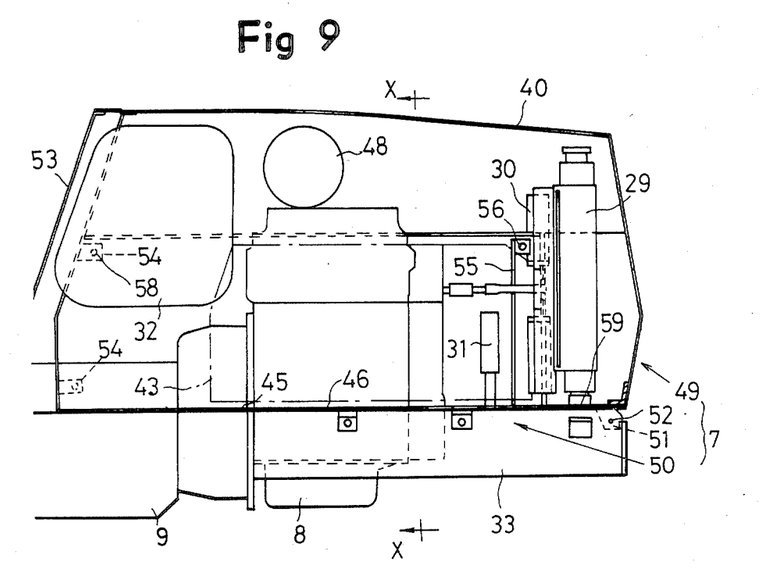
FIG. 9 is a side elevation in section showing the interior of the bonnet.
Figure 10:
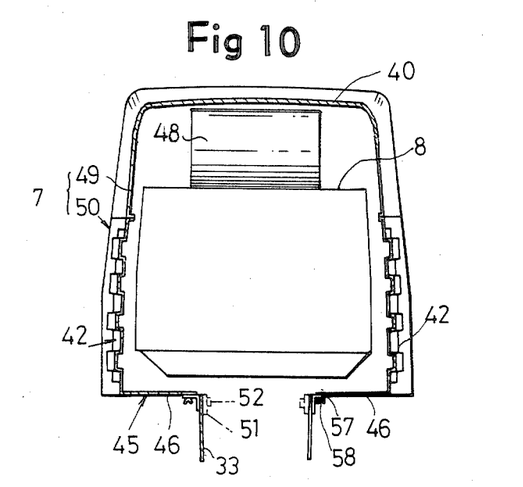
FIG. 10 is a view in section taken along the line X—X in FIG. 9.

FIGS. 8 to 10 show another bonnet 7 embodying the present invention and covering an engine 8, a radiator 29, a cooling fan 30, a fuel tank 32, etc. The bonnet 7 comprises a bonnet main body 49 L-shaped when seen from one side and including a rear side 41, a top side 40 and opposed lateral side upper portions which are in the form of an assembly, and a pair of opposed side plates 50 each including a lateral side lower portion 42 and a bottom portion 45 which are in the form of an assembly.

The bonnet main body 49 has at its rear lower portion bearing portions 51 and is pivoted at these portions 51 to the rear ends of rear axle frames 33 by lateral pins 52. The front end of the bonnet main body 49 rests on an upstanding wall 53 provided at the rear of an operator's seat 6 and fixed to the vehicle body and is fastened to the wall 53 by unillustrated means. Accordingly, the bonnet main body 49 is pivotally movable rearward about the lateral pins 52 for the maintenance of the devices within the bonnet 7.

The side plates 50 are positioned to the front of the radiator 29. The lateral side lower portion 42 and the bottom portion 45 of each plate 50 are provided with cooling air intake openings 43, 46, respectively, formed for example by punching a metal sheet or the like. The lateral portion 42 has projections or indentations (or is planar) to provide apertures constituting the intake opening 43. The bottom portion 45 is planar where the intake opening 46 is formed.

The side plate 50 is formed from a single plate by punching the air intake openings 43, 46 in the plate and then bending the plate to an L-shape. The lateral side lower portion 42 is removably fastened at its upper end to a bracket 54 fixed to the upstanding wall 53 and to a bracket 56 on a support frame 55 extending upright from the frame 33, using bolts or thumbscrews 58. The bottom portion 45 is similarly fastened at its inner end to brackets 57 fixed to the frame 33.

The lateral side lower portion 42 and the bottom portion 45 of the side plate 50 may be prepared as separate members and removably attached to the vehicle body individually. Alternatively, the frame 33 may have fixed thereto a plate serving as the bottom portion 45. A plate providing the lateral portion 42 may then be removably attached to the brackets 54, 56 or to the bonnet main body 49 and the bottom plate.

The bottom portion 45 closes the space between the lower edge of the lateral side lower portion 42 and the vehicle body. The outside air to be drawn into the bonnet 7 from below the vehicle body by the cooling fan 30 is admitted only through the intake opening 46 which is positioned to the front of the fan 30. The rear lower portion of the bonnet main body 49 also has a bottom portion 59 for closing the space between the rear side (end) 41 and the vehicle body to prevent the hot air passing through the radiator 29 from being drawn in again by the cooling fan 30.

Figure 11:
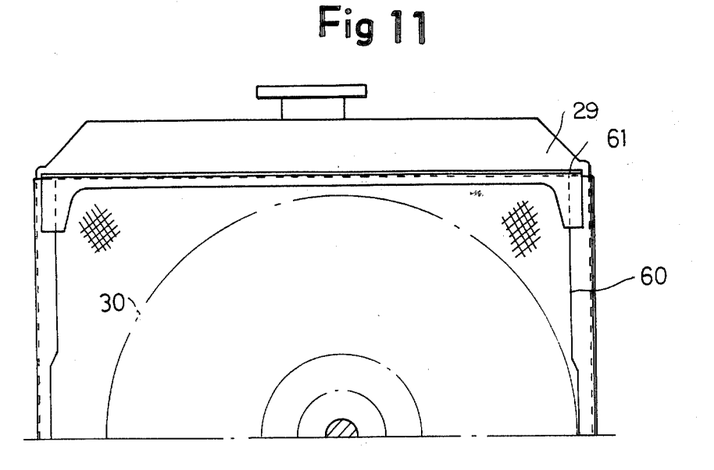
FIG. 11 is a rear view showing a structure for supporting an insect excluding netting.
Figure 12:
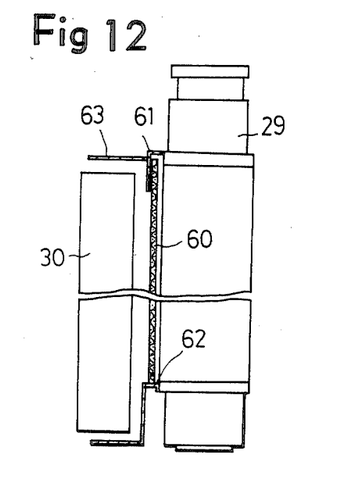
FIGS. 12 and 13 are sectional views showing the netting.
Figure 13:
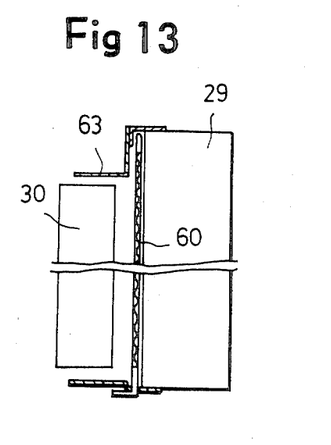

An insect excluding netting (insect netting) 60 is provided between the radiator 29 and the cooling fan 30 as illustrated in detail in FIGS. 11 to 13.

An upper rail 61 and a lower rail 62 are provided in front of the radiator 29 for supporting the insect netting 60 withdrawably in a lateral direction. A cover 63 having a circular or square cross section is attached to the upper and lower rails 61, 62 for protecting the cooling fan 30.

The insect netting 60, which is positioned rearwardly of the opposed side plates 50, is withdrawable laterally in one direction when the bonnet main body 49 is opened. When withdrawn, the netting can be cleaned.

The center of the cooling fan 30 is positioned toward one side of the center of the vehicle body. A muffler is disposed substantially horizontally at one side of the bonnet 7 outside thereof. A cutout for passing an exhaust pipe is formed in the lateral side lower portion 42 of the plate 50 at this side.

FIGS. 14 to 17 show another bonnet 7 embodying the present invention. The bonnet 7 has a vertical partition 64 dividing the interior of the bonnet 7 into front and rear rooms which are a fuel tank room 65 and an engine room 66, respectively. A fuel tank 32 is installed in the fuel tank room 65.

Arranged within the engine room 66 are an engine 8, an oil cooler 31 at the rear thereof, a cooling fan 30 at the rear of the cooler and a radiator 29 at the rear of the fan 30.

The engine 8 has attached to one side thereof a muffler 67, from which an exhaust pipe 68 extends rearwardly downward. The exhaust pipe 68 has an open rear end. At the other side of the engine 8 opposite to the muffler 67, an air cleaner 48 is provided.

Figure 16:
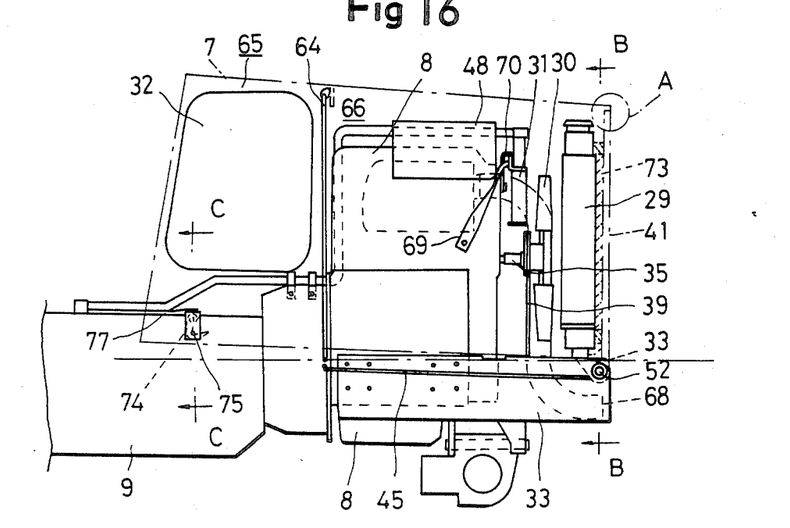
FIG. 16 is a side elevation showing the interior of the bonnet.

The cooling fan 30 is mounted on the rear end of a drive shaft 35 supported directly by the rear side of the engine 8. A fan belt 39 reeved around the drive shaft 35 is driven by the crankshaft of the engine. Since the fan 30 is driven by the drive shaft 35 which is thus supported directly by the rear end of the engine 8, the elongated fan shaft or fan shaft support conventionally used can be dispensed with. The engine room 66 therefore has a shortened overall length.

The oil cooler 31 is positioned above the drive shaft 35 and supported by brackets 69 and 70 respectively attached to a side portion and the rear end of the engine 8. Since the cooling fan 30 produces a current of air flowing from the front rearward, the air current flows more smoothly to achieve a higher cooling effect than when the oil cooler 31 is positioned below the drive shaft 35.

Figure 18:
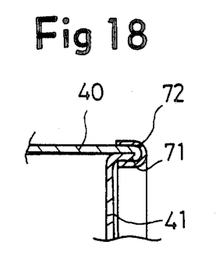
FIG. 18 is an enlarged view showing the portion A in FIG. 16.

The bonnet 7 comprises a bonnet main body 49 including a top side 40 and opposite lateral sides 42 which are in the form of an assembly of inverted U-shaped cross section. The bonnet main body 49 has a rear side which is closed with a rear grille 41. As seen in FIG. 18, the rear grille 41 has at its outer edge a folded-over portion 71, the outer periphery of which is in contact with and spot-welded or otherwise joined to the inner peripheral surface of the bonnet main body 49. A trim 72 of U-shaped cross section is fitted over the joint of the main body 49 and the grille 41 to give an improved appearance. The rear grille 41 provides a cooling air discharge opening 47.

Figure 19:
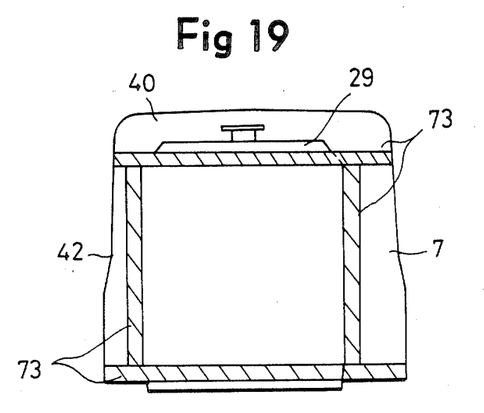
FIG. 19 is a view in section taken along the line B—B in FIG. 16.

As shown in FIGS. 16 and 19, a sponge tape 73 is affixed to the inner surface of the rear grille 41 to surround the discharge opening 47 for the radiator 29 and is in intimate contact with the rear surface of the radiator 29.

The sponge tape 73 provided obviates the likelihood that the hot air passing through the radiator 29 will pass through the clearance between the radiator 29 and the rear grille 41 and reversely flow through the engine room 66.

Figure 14:
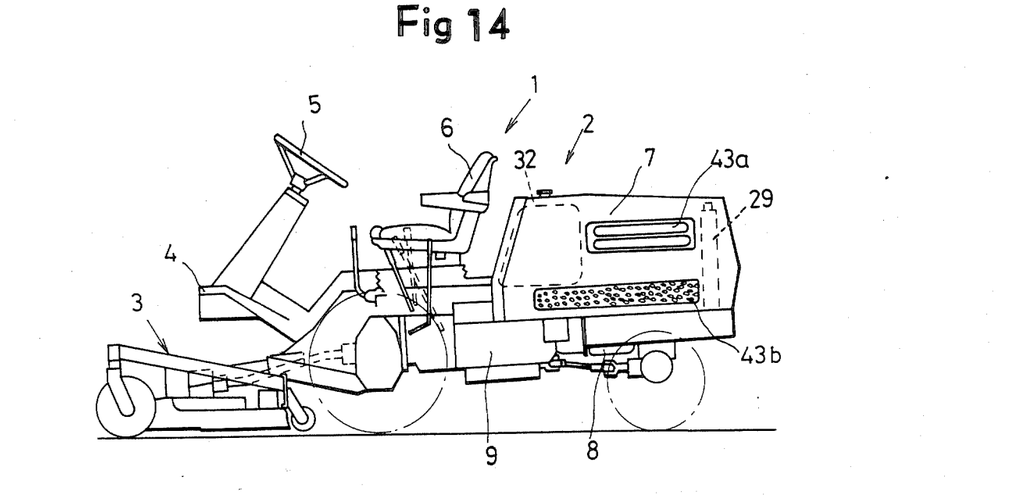
FIG. 14 is an overall side elevation showing another embodiment.

As seen in FIG. 14, a cooling air intake opening 43a comprising front-to-rear elongated apertures is formed in an upper portion of each lateral side 42 of the bonnet main body 49. An air intake opening 43b provided by a punched metal plate is formed in a lower portion of the lateral side 42.

Figure 20:
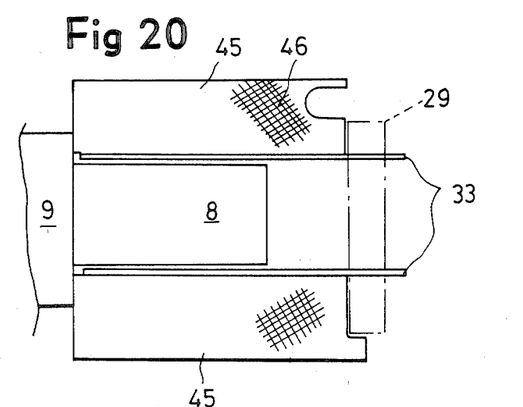
FIG. 20 is a plan view showing the bottom side of the bonnet.

With reference to FIG. 20, the bonnet 7 has bottom portions 45 each entirely made of a punched metal plate to provide an air intake opening 46.

Figure 17:
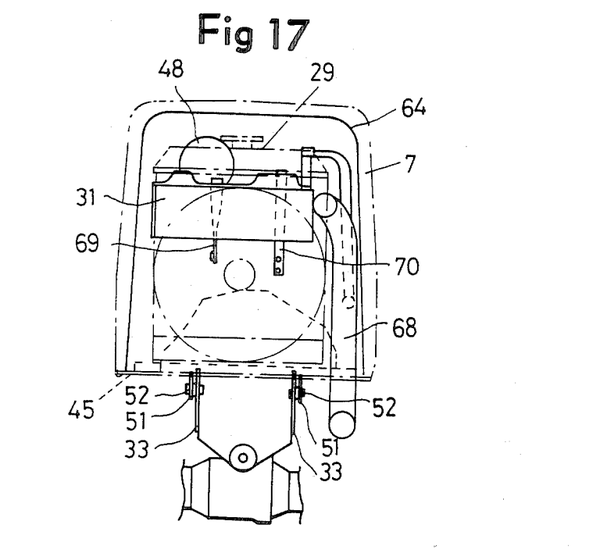
FIG. 17 is a rear view showing the same.

The rear grille 41 of the bonnet 7 is provided at its lower end with a pair of opposed bearing portions 51, which are pivoted by lateral pins 52 to rear axle frames 33 attached to the opposite sides of the engine 8 as shown in FIG. 17. Accordingly, the front portion of the bonnet 7 is pivotally movable upward about the lateral pins 52.

Figure 21:
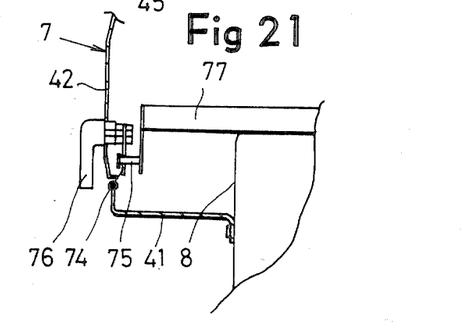
FIG. 21 is a view in section taken along the line C—C in FIG. 16.

As shown in FIG. 21, the front portion of the bonnet 7 has a rotatable hook 74 at each of its opposite sides. The engagement of the hook 74 with a retaining pin 75 on the vehecle body prevents the bonnet 7 from moving pivotally upward. The hook 74 is rotatable by a handle 76 attached to the side plate 42 of the bonnet 7. The retaining pin 75 is attached to each end of a transverse frame 77 fixed to the top of the transmission case 9.

Figure 15:
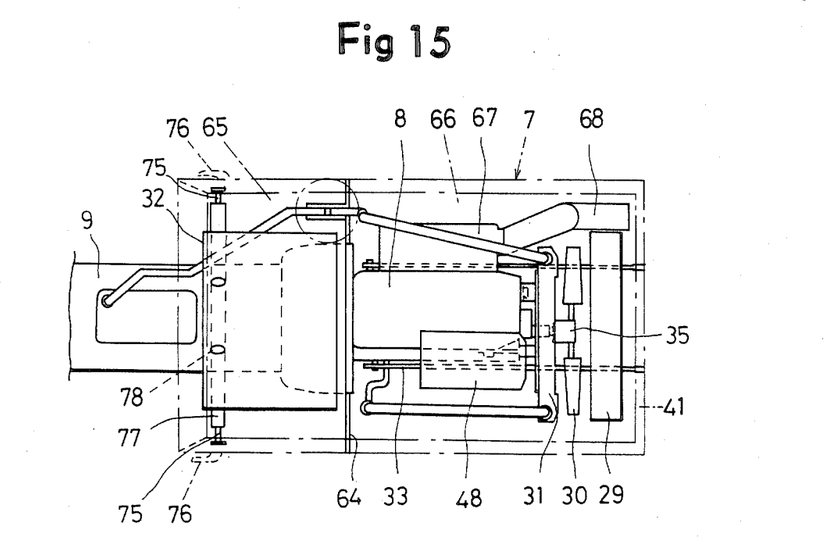
FIG. 15 is a plan view showing the interior of the bonnet of the embodiment.

With reference to FIG. 15, the transverse frame 77 is fastened to the top of the case 9 by bolts inserted through holes 78 which are formed in the frame 77 at intermediate portions thereof and elongated in the front-to-rear direction. The pins 75 are positioned suitably for the hooks 74 by adjusting the position of the transverse frame 77 forward or rearward within the range of elongated holes 78. Thus, the opposite pins 75 can be positioned for the hooks 74 at the same time more easily than when the pins are adjusted individually.

According to the present invention, the mower assembly 3 may be provided under the vehicle body between the front wheels 11 and the rear wheels 14.

The present invention is not limited to the foregoing embodiments but can be modified as desired within the scope of the appended claims.

What is claimed is:

1. A riding type mower comprising
a vehicle body having a front and a rear,
an operator seat located on said vehicle body,
a mower mounted to a front part of said vehicle body and being lower than said operator seat,
a fuel tank, an engine, a cooling fan and a radiator being positioned on said vehicle body in that order rearwardly of said operator seat,
said cooling fan being constructed to conduct cooling air from the front to the rear of said vehicle body,
a bonnet covering said fuel tank, said engine, said cooling fan, and said radiator,
said bonnet comprising a top side and two lateral sides which extend over and along the sides of said fuel tank, said engine, said cooling fan and said radiator,
said bonnet also comprising a rear side which shields the rear of said radiator, bottom sides which extend between the vehicle body and bottom edges of said lateral sides, and a front side having an opening,
said fuel tank being disposed inside said opening for closure thereof,
said bonnet being pivoted below said rear side to said vehicle body so that said rear side and said top side are pivotally movable together,
cooling air intake openings are disposed in said lateral sides and in said bottom sides forwardly of said cooling fan, and
a cooling air discharge opening formed in said rear side of said bonnet.

2. A riding type mower as defined in claim 1, wherein an oil cooler is disposed between said engine and said cooling fan.

3. A riding type mower as defined in claim 1, wherein an oil cooler is disposed at one side with respect to a drive shaft.

4. A riding type mower as defined in claim 2, wherein said cooling fan is fixed to a drive shaft rotatably supported by a rear side of said engine, and said drive shaft is operatively connected to a crankshaft of said engine by transmission means.

* * * * *